Aug. 3, 1926.
H. F. LEUCK
ROOT CUTTER
Filed Oct. 2, 1925
1,595,008
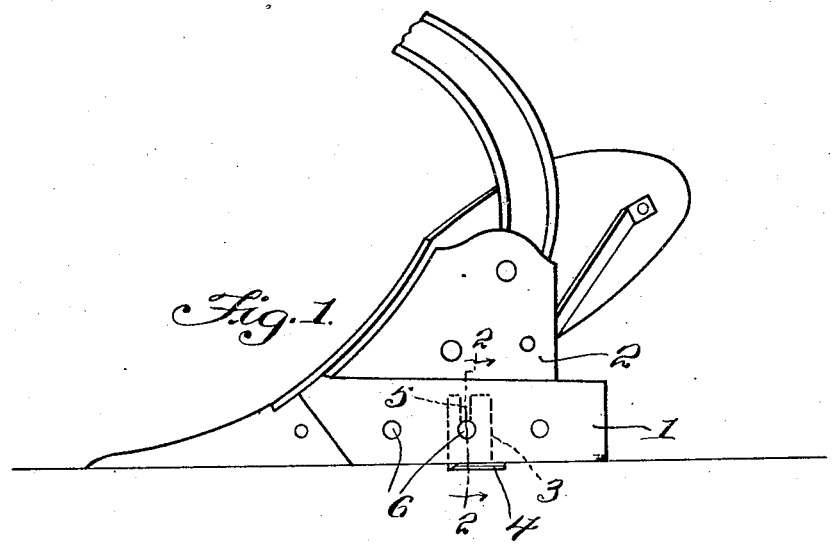
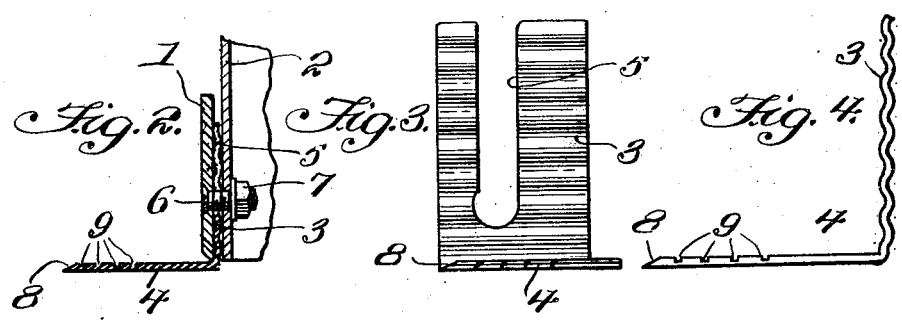
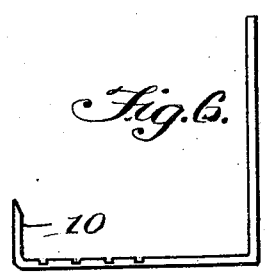
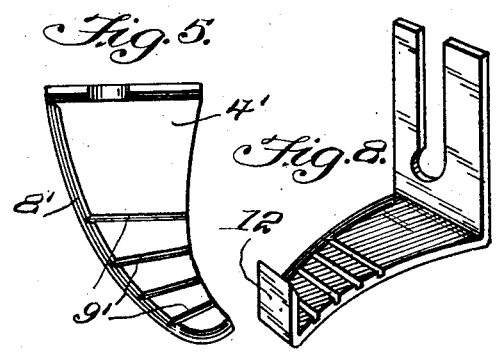
Hubert F. Leuck
INVENTOR
BY Victor J. Evans
ATTORNEY
WITNESS: J. L. Wright Patented Aug. 3, 1926.

1,595,008

UNITED STATES PATENT OFFICE.

HUBERT F. LEUCK, OF PILGER, NEBRASKA.

ROOT CUTTER.

Application filed October 2, 1925. Serial No. 60,073.

My present invention has reference to a root cutter designed to be removably and adjustably secured between the landside and the standard of a plow which will materially assist in the plowing operation by cutting roots of alfalfa, clover or other growths.

A further object is the provision of a root cutter attachment for plows of a construction that permits of the quick and easy arrangement of the device between the landside and the standard of a plow and which is held on the plow by one of the bolts that attaches the landside to the standard.

A further object is the provision of a root cutter for plows that has its cutting blade arranged at a right angle with respect to its body and which blade has its cutting edge arranged at a curvature or angle so that a shearing action by the blade is obtained upon the roots to be cut.

A further object is the provision of a root cutter in which the cutting blade therefor is formed with spaced weakening grooves whereby the outer portion of the blade may be severed from the remainder thereof so that roots at a desired distance from the landside of the plow may be severed and further wherein the outer end of the blade may be bent on a line with weakened grooves to provide an upstanding portion which will assist in guiding the plow.

In the drawings:—

Figure 1 is a side elevation of a plow showing my improvement thereon.

Figure 2 is an enlarged sectional view approximately on the line 2—2 of Figure 1.

Figure 3 is a front elevation of the improvement.

Figure 4 is a side elevation thereof.

Figure 5 is a top plan view illustrating a modification.

Figure 6 is an edge view of a further modification.

Figure 7 is a plan view of a still further modification.

Figure 8 is a perspective view of a still further modification.

Referring now to the drawings in detail, and to Figures 1 and 2 in particular, the landside of a plow is indicated by the numeral 1 and the standard by the numeral 2. The landside is secured to the standard by the usual bolts and nuts.

In the preferred embodiment of my improvement, the root cutter includes what I will term a body portion 3 which is corrugated longitudinally and integrally formed on one end of the said body there is a right-angularly disposed blade 4. The corrugated body 3 is provided with an elongated slot 5. The body 3 is inserted between the landside 1 and the standard 2, while one of the bolts 6 passes through the slot 5. The nut 7 for the bolt 6 is then screwed home on the said bolt. In this manner it will be noted that the root cutter is adjustably and removably attached to the plow. Also it will be noted that the root cutter may be attached and held adjusted in an easy and expeditious manner.

The blade 4 has its active or sharpened edge 8 disposed at an angle with respect to the body 3. In order to strengthen the blade preferably both of the edges are arranged at the same inclination from the body. The blade 4, throughout its length, but at points adjacent to its outer and sharpened edge, is provided with longitudinal grooves 9. These grooves weaken the blade at desired points throughout the transverse length thereof and the said blade may be severed in a line with any of said grooves. If desired, the outer end of the blade may be bent upwardly along one of the said weakened lines. By constructing the blade as above described, it will be noted that roots may be cut at any desired distance from the landside of the plow.

In Figure 5 the blade 4' has both its sharpened edge 8' and its non-sharpened edge curved toward the outer and what may be termed the pointed end of the said blade. Also the blade 4' is arched upwardly from its body to its outer end. The blade is provided with weakening grooves 9'.

In Figure 6 the construction is substantially similar to that above described, except the outer edge of the blade is formed with an upturned flange 10 arranged parallel to the body of the blade. This materially assists the plow in its movement through the ground surface.

In Figure 7 the construction is somewhat similar to that disclosed in Figure 5. In this figure, however, both the sharpened and non-sharpened edges of the blade are rounded toward each other from the body of the said blade but the blade 11 is arched longitudinally throughout the length thereof. The blade is provided with the weakening grooves.

In Figure 8 the blade is substantially similar to that disclosed in Figure 7, except that the same is arched in an opposite direction to that shown in said Figure 7. Also in Figure 8 the outer edge of the blade is flanged upwardly, as at 12. Both the flanges 10 and 12 have their outer edges sharpened.

Having described the invention, I claim:—

1. A root cutter for plows designed to be arranged between the landside and the standard of a plow, and to be secured therebetween by one of the bolts that connects these elements together, said root cutter comprising a slotted body through which the mentioned bolt passes, a blade arranged outwardly with respect to the body and said blade having its sharpened edge arranged at a curvature with respect to the body, and said blade having weakening grooves arranged transversely throughout the length thereof.

2. A root cutter for plows designed to be arranged between the landside and the standard of a plow, and to be secured therebetween by one of the bolts that connects these elements together, said root cutter comprising a slotted body through which the mentioned bolt passes, a blade arranged at an outward angle with respect to the body and said blade having its sharpened edge arranged at a curvature with respect to the body, and said blade being arched longitudinally and provided with transverse weakening grooves at points adjacent its outer end.

3. A root cutter for plows, comprising a corrugated body which is slotted and a blade integrally formed on one end of the body and extending angularly therefrom and said blade having its sharpened edge disposed at a curvature from the said body.

In testimony whereof I affix my signature.

HUBERT F. LEUCK.